United States Patent
Laurent et al.

(10) Patent No.: US 12,487,730 B2
(45) Date of Patent: Dec. 2, 2025

(54) METHOD FOR ANALYZING ACTIVITY OF A USER OF AN ELECTRONIC TERMINAL

(71) Applicant: Orange, Issy les Moulineaux (FR)

(72) Inventors: Sonia Laurent, Chatillon (FR); Mickael Le Troquer, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/903,737

(22) Filed: Sep. 6, 2022

(65) Prior Publication Data
US 2023/0075660 A1    Mar. 9, 2023

(30) Foreign Application Priority Data
Sep. 6, 2021    (FR) ...................................... 2109308

(51) Int. Cl.
*G06F 3/0484* (2022.01)
*G06F 3/01* (2006.01)
*G06F 3/0481* (2022.01)
*G06F 9/451* (2018.01)
*G08B 21/18* (2006.01)

(52) U.S. Cl.
CPC ............ *G06F 3/0484* (2013.01); *G06F 3/013* (2013.01); *G06F 3/0481* (2013.01); *G08B 21/18* (2013.01); *G06F 9/453* (2018.02)

(58) Field of Classification Search
None
See application file for complete search history.

(56) References Cited

U.S. PATENT DOCUMENTS

| | | | |
|---|---|---|---|
| 7,631,007 B2 * | 12/2009 | Morris ................. | G06Q 10/063 709/227 |
| 9,756,140 B2 * | 9/2017 | Richardson ........ | G06Q 30/0242 |
| 10,063,645 B2 * | 8/2018 | Yavilevich ............ | H04L 67/535 |
| 2005/0246360 A1 * | 11/2005 | Tanny ................. | G06F 16/2457 |
| 2009/0024964 A1 * | 1/2009 | Kantamneni .......... | G06Q 30/02 715/854 |
| 2015/0131850 A1 * | 5/2015 | Qvarfordt ................. | G06T 7/74 382/103 |
| 2017/0212583 A1 * | 7/2017 | Krasadakis ........... | G06F 3/0482 |
| 2017/0293407 A1 * | 10/2017 | Todasco .................. | G06F 3/016 |
| 2018/0246937 A1 * | 8/2018 | Alphin, III ............ | G06F 16/904 |

* cited by examiner

*Primary Examiner* — William L Bashore
*Assistant Examiner* — Koorosh Nehchiri
(74) *Attorney, Agent, or Firm* — Knobbe, Martens, Olson & Bear, LLP (57) ABSTRACT

A method for analyzing activity of a user of an electronic terminal is disclosed. The method includes obtaining contextual characteristics associated with at least one zone among a plurality of display zones of at least one screen of the electronic terminal, as a function of usage data of the terminal comprising data relating to a direction of gaze, data relating to a system activity of the terminal and/or data input to the terminal; and determining at least one activity indicator on the zone, depending on the contextual characteristics associated with the zone.

19 Claims, 3 Drawing Sheets

| Z1 | Z2 | Z3 |
|---|---|---|
| IA1 = 0,01<br>IA2 = 0,01<br>IA3 = 0<br>IA4 = 0 | IA1 = 0,76<br>IA2 = 0,73<br>IA3 = 0,3<br>IA4 = 0,3 | IA1 = 0,7<br>IA2 = 0,5<br>IA3 = 0,3<br>IA4 = 0,2 |
| Z4 | Z5 | Z6 |
| IA1 = 0,01<br>IA2 = 0,01<br>IA3 = 0,11<br>IA4 = 0,12 | IA1 = 0,85<br>IA2 = 0,82<br>IA3 = 0,2<br>IA4 = 0,2 | IA1 = 0,51<br>IA2 = 0,51<br>IA3 = 0,4<br>IA4 = 0,2 |
| Z7 | Z8 | Z9 |
| IA1 = 0,01<br>IA2 = 0,1<br>IA3 = 0<br>IA4 = 0,7 | IA1 = 0,01<br>IA2 = 0,01<br>IA3 = 0,09<br>IA4 = 0 | IA1 = 0,6<br>IA2 = 0,8<br>IA3 = 0,1<br>IA4 = 0,05 |

| Z1                                          | Z2                                          | Z3                                         |
| IA1 = 0,01<br>IA2 = 0,01<br>IA3 = 0<br>IA4 = 0 | IA1 = 0,76<br>IA2 = 0,73<br>IA3 = 0,3<br>IA4 = 0,3 | IA1 = 0,7<br>IA2 = 0,5<br>IA3 = 0,3<br>IA4 = 0,2 |
| Z4                                          | Z5                                          | Z6                                         |
| IA1 = 0,01<br>IA2 = 0,01<br>IA3 = 0,11<br>IA4 = 0,12 | IA1 = 0,85<br>IA2 = 0,82<br>IA3 = 0,2<br>IA4 = 0,2 | IA1 = 0,51<br>IA2 = 0,51<br>IA3 = 0,4<br>IA4 = 0,2 |
| Z7                                          | Z8                                          | Z9                                         |
| IA1 = 0,01<br>IA2 = 0,1<br>IA3 = 0<br>IA4 = 0,7 | IA1 = 0,01<br>IA2 = 0,01<br>IA3 = 0,09<br>IA4 = 0 | IA1 = 0,6<br>IA2 = 0,8<br>IA3 = 0,1<br>IA4 = 0,05 |

METHOD FOR ANALYZING ACTIVITY OF A USER OF AN ELECTRONIC TERMINAL

CROSS-REFERENCE TO RELATED APPLICATIONS

This application claims foreign priority to French Patent Application No. FR 2109308, entitled "METHOD FOR ANALYSING ACTIVITY OF A USER OF AN ELECTRONIC TERMINAL" and filed Sep. 6, 2021, the content of which is incorporated by reference herein in its entirety.

BACKGROUND

Field

The development lies in the field of electronic terminals able to execute a plurality of applications. More particularly, the development is concerned with techniques enabling, for example, implementation of smart assistance systems, capable of accompanying a user when using an electronic terminal.

Description of the Related Technology

Electronic terminals (computers, smartphones, tablets, etc.) can have increasingly large screens and computing capacities enabling them to run more and more applications simultaneously.

Within this context, assistance systems are very relevant: they propose, for example via a mechanism of on-screen notifications, help or suggestions to a user of an electronic terminal, with regard to a customary use of the electronic terminal (for example to help the user who seems to be facing a difficulty in using an application, to propose the automation of a repetitive task, the automatic completion and drafting of replies to e-mails, etc.)

However, current assistance systems are most often intrinsic to applications, that is, an application integrates its own assistance mechanism, different from that of another application. This can lead to a lack of coherence, and to significant disparities between the notifications offered by different applications (in terms of volume, usefulness, etc.)

So-called cross-cutting assistance systems—that is, not specific to a given particular application—have been provided to remedy these drawbacks. However, these existing cross-cutting assistance systems sometimes provide inadequate assistance and could still be improved.

Regardless of the system implemented, the result is often the receipt of too many notifications that are inappropriate or unsuited to the user's needs, with the risk of an overload of useless information likely to make the user bored or waste his/her time. The result is thus the opposite of the desired effect, and potentially counterproductive.

There is therefore a need for a solution for improving existing assistance systems.

SUMMARY

The present technique makes it possible to provide a solution aimed at remedying some drawbacks of prior art. The present technique is indeed concerned with a method for analyzing activity of a user of an electronic terminal. Such a method comprises:
  obtaining contextual characteristics associated with at least one zone among a plurality of display zones of at least one screen of an electronic terminal, depending on usage data of said terminal comprising data relating to a direction of gaze, data relating to a system activity of said terminal and/or data input to said terminal;
  determining at least one activity indicator on said zone, depending on said contextual characteristics associated with said zone.

In one particular embodiment of the technique provided, said terminal usage data are delivered by software and/or hardware probes comprising at least a probe for detecting a gaze direction, a probe for analyzing system activity of said terminal, and/or a probe for scanning at least one input device associated with said terminal.

In one particular embodiment of the technique provided, said contextual characteristics associated with the zone belong to the group comprising:
  information relating to a duration for which a gaze is directed towards said zone;
  information relating to a number of times the gaze is directed towards said zone;
  information relating to a type of application associated with an application window at least partially displayed in said zone;
  information representative of a fixed or changing state of a content displayed in said zone, independently of an action on a user interface of said terminal;
  information representative of an interaction or absence of interaction with a content displayed in said zone;
  information representative of a type of interaction performed on said zone.

In one particular embodiment of the technique provided, said at least one activity indicator comprises at least:
  an indicator of productivity within said zone, representative of a content production level within said zone;
  an indicator of attention for said zone, representative of a level of interest in a content displayed in said zone; and
  an indicator of complexity of said zone, representative of a level of misunderstanding, difficulty encountered, and/or confusion with respect to content displayed in said zone; and
  an indicator of introspection associated with said zone, representative of a level of tiredness and/or reflection with respect to a content displayed in said zone.

In one particular embodiment of the technique provided, determining an activity indicator comprises attributing scores to said contextual characteristics, and takes account of weighting coefficients of said scores.

In one particular embodiment of the technique provided, determining at least one activity indicator is implemented subsequent to detecting at least one event belonging to the group comprising:
  opening, closing, resizing and/or moving an application window at said zone;
  a duration for which the gaze is directed towards said zone during a first time interval;
  a number of times the gaze is returned to said zone during a second time interval.

In one particular embodiment of the technique provided, said at least one activity indicator determined for said zone is stored within a data structure, to obtain a history of said activity indicator associated with said zone.

In one particular embodiment of the technique provided, said at least one activity indicator determined is further associated, in said data structure or in another data structure, with an application type and/or with a file corresponding to the content of an application window at least partially displayed in said zone upon said determining.

In one particular embodiment of the technique provided, said plurality of display zones form a partition of said screen.

In one particular embodiment of the technique provided, said screen is substantially rectangular in shape, and the zones of said plurality of display zones correspond to a grid of said screen.

In one particular embodiment of the technique provided, the zones of said plurality of display zones correspond to intersections between rows having a substantially equivalent height and columns having a substantially equivalent width cutting said screen.

In one particular embodiment of the technique provided, said obtaining a set of contextual characteristics and said determining at least one activity indicator are implemented for all zones of said plurality of display zones.

According to another aspect, the technique provided is also concerned with an electronic device comprising:
- means for obtaining a set of contextual characteristics associated with at least one zone among a plurality of display zones of a screen of an electronic terminal, depending on usage data of said terminal comprising data relating to a direction of gaze, data relating to a system activity of said terminal and/or data input to said terminal;
- means for determining at least one activity indicator on said zone, depending on said contextual characteristics associated with said zone.

The means of said electronic device may be adapted to implement any of the embodiments of the method of the present application.

According to another aspect, the technique provided is also concerned with a computer program product downloadable from a communication network and/or stored on a computer-readable medium and/or executable by a microprocessor, comprising program code instructions for executing a method for analyzing activity of a user of an electronic terminal as previously described, when executed on a computer.

The technique provided is also directed to a computer-readable storage medium on which a computer program comprising program code instructions for executing the steps of the method as previously described, in any of its embodiments, is recorded.

Such a recording medium may be any entity or device capable of storing the program. For example, the medium may include a storage medium, such as a ROM, for example a CD ROM or a microelectronic circuit ROM, or even a magnetic recording medium, for example a USB key or a hard disk.

On the other hand, such a recording medium may be a transmissible medium such as an electrical or optical signal, which may be conveyed via an electrical or optical cable, by radio or by other means, so that the computer program contained therein is remotely executable. In particular, the program according to the development can be downloaded from a network, for example the Internet.

The different embodiments mentioned above can be combined with each other for the implementation of the development.

BRIEF DESCRIPTION OF THE DRAWINGS

Further characteristics and advantages of the development will become clearer upon reading the following description of a preferred embodiment, given by way of a simple illustrative and non-limiting example, and the appended drawings, among which.

DETAILED DESCRIPTION OF CERTAIN ILLUSTRATIVE EMBODIMENTS

The present application remedies at least some of the aforementioned drawbacks.

The technique provided is concerned with a method for analyzing activity of a user of an electronic terminal (e.g. a fixed or portable personal computer, a digital tablet, a smartphone, etc.), and especially aims at creating a common base that services (internal to the terminal or third parties) can then utilise to offer various functionalities, and especially smart assistants capable of providing information taking account of a user context. For example, as is shown in what follows, it is suggested to take account of a spatial dimension, namely to carry out localised analysis of the use of an electronic terminal, differentiated by display zones of the terminal screen. Thus, this opens the way, for example, to an improvement in existing cross-cutting assistance systems, which sometimes offer inadequate assistance because they do not sufficiently take account of the zone of the screen which is the object of a particular activity or attention by the user.

Within the scope of the present technique, the electronic terminal may comprise a screen for displaying information delivered, for example, by the operating system of the electronic terminal or by applications running on the electronic terminal. The information displayed by the operating system of the electronic terminal includes, for example, a screen background, system information, various notifications, etc. The information resulting from the execution of an application is generally shown in an application window which, depending on the type of electronic terminal and/or the user's choice, may be displayed in full screen mode (the interface of the application used occupies all or almost all of the surface area available on the screen, for example because the electronic terminal does not allow multi-windowing) or not. Although not limited to this embodiment, the method provided is particularly adapted to be implemented on an electronic terminal that allows multi-windowing, namely the simultaneous display of several application windows on the terminal screen. It should be noted in this respect that the increasingly large size of the screens on board electronic terminals, combined with the ever-increasing computing power of these terminals, mean that multi-windowing is becoming more and more widespread, and that it is no longer the preserve of personal computers. It is now available on many electronic terminals with smaller screens, such as smartphones or digital tablets for example.

In all the figures herein, identical elements and steps are designated by a same numerical reference.

Figure 1:
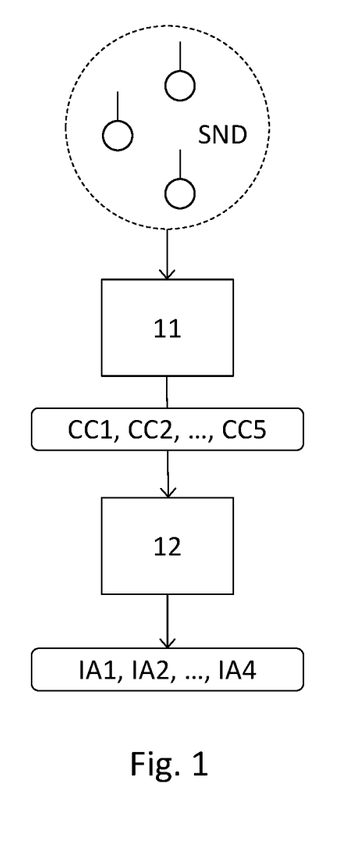
FIG. 1 illustrates the main steps of the method for analyzing activity of a user of an electronic terminal, in one particular embodiment of the technique provided.

The general principle of the analysis method according to the technique provided is now set forth, in connection with FIG. 1, in one exemplary and non-limiting embodiment. This method is implemented by an electronic device which may or may not be integrated into the user's electronic terminal, as described below.

In a step 11, the electronic device obtains a set of contextual characteristics associated with at least one of a plurality of display zones of at least one screen coupled to the electronic terminal in use.

Figure 2A:
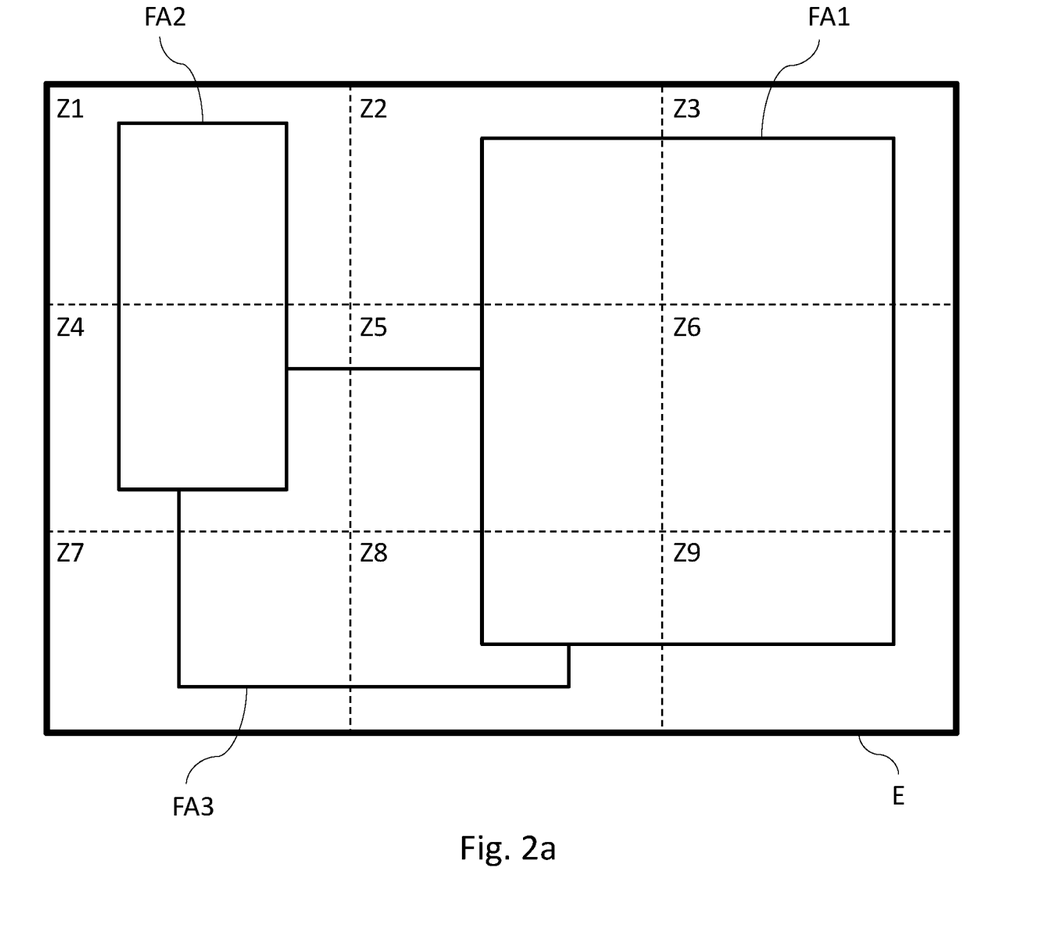
FIG. 2a shows an example of division of the screen of a terminal into a plurality of display zones, for illustrating an example of application of the method of FIG. 1.

In one embodiment of the present technique, the aforementioned plurality of display zones corresponds to a virtual division, by the electronic device, of an entire display surface associated with the electronic terminal. In other words, the plurality of display zones forms a partition of the display surface. This display surface may, for example, correspond to the display surface of a single screen integrated into or coupled to the electronic terminal, or even to the surface of a display extended over several screens integrated into or coupled to the electronic terminal (in the case where display surfaces of several physical screens are used to form a single logical screen). In the conventional case where the screen is rectangular or substantially rectangular in shape (a curved screen but with a rectangular projection onto a plane being considered, within the scope of the present technique, as a rectangular-shaped screen), these display zones correspond, for example, to a grid of the screen. Such a grid may be regular, in which case the zones of the plurality of display zones correspond to intersections between rows having a substantially equivalent height and columns having a substantially equivalent width cutting the display screen. All the display zones are thus substantially equivalent in size. FIG. 2a illustrates how the screen S of an electronic terminal can, for example, be virtually divided into 9 display zones Z1 to Z9 having substantially identical sizes. This example is deliberately simplified to facilitate understanding of the technique provided, it being understood that the screen of the electronic terminal can in practice be divided into a much larger number of zones. For example, a screen with a resolution of 1920 pixels by 1080 pixels can be virtually divided into 200 rectangular zones having identical sizes of 96 pixels by 108 pixels (cutting into 20 of the width of 1820 pixels, and 10 of the height of 1080 pixels). Other ways of dividing a screen into a plurality of display zones, other than cutting into rectangular zones or zones having identical sizes, are however contemplatable within the scope of the present technique (for example, cutting into zones of varying dimensions, the dimensions of which result, for example, from cutting by application window or at least taking account of the applications generating the display portions considered, or even cutting by type of information displayed).

The contextual characteristics obtained in step 11 depend on terminal usage data, which comprise, for example, data relating to the direction of the user's gaze of the electronic terminal, data relating to a system activity of the electronic terminal (e.g. system information delivered, for example, by the operating system of the electronic terminal, and application information delivered, for example, by applications running on the electronic terminal), and/or data input to the terminal by the user.

According to the technique provided, these usage data are fed back by software and/or hardware probes, some of which may take the form, in particular, of software modules possibly coupled to sensors. These probes are configured to detect events and deliver information relating to the current (i.e. in progress) use of the electronic terminal by a user.

Such probes comprise for example:
at least one probe for detecting the direction of the user's gaze;
at least one probe for analyzing system activity of said terminal; and
at least one probe for scanning at least one input device associated with the terminal.

At least one probe for detecting the direction of the user's gaze may integrate or be coupled to a camera that delivers images of the user's face while using the electronic terminal. This probe can analyse at least some of these images in real time, so as to determine, via conventional eye-tracking techniques, where the user's gaze is focused at least at one moment, and more particularly, on which zone of the screen of the electronic terminal.

At least one probe for analyzing system activity of the electronic terminal may, for example, take the form of an application programming interface (API) made available by the operating system of the electronic terminal. This probe may, for example, provide information on some system events (display of notifications, network interface used, network throughput, etc.) It may also provide information relating to applications while running on the terminal, such as the name and/or type of some applications being executed, the name of open contents in these applications (e.g. file name, name of videos or music being played, address or URL of a website while being consulted, etc.), a size, position and/or display rank of application windows related to the execution of these applications, etc. The position and size information may, for example, allow screen pixels to be matched to the area of an application window, and more particularly to the zone(s) of the plurality of display zones where it extends. In the case where the application window is rectangular in shape, this information may include, for example, coordinates of a point (e.g. those of the top left corner of the rectangular window) and a pair of dimensions (height, width) of the application window (in number of pixels for example). Thus, back to the example of FIG. 2a, it may be possible to determine that the application window FA1 of a first application extends over the zones Z2, Z3, Z5, Z6, Z8, and Z9 of the screen S of the electronic terminal, that the application window FA2 of a second application extends over the zones Z1 and Z4 of the screen S, and that the application window FA3 of a third application extends over the zones Z4, Z5, Z7, and Z8 of the screen S. However, the present technique is not limited to rectangular shaped application windows. The display rank, also known as the "ordering value", indicates, for example, that an application window is displayed in the foreground or in the background, behind one or several other windows (for example, the application window FA3 is partially hidden by the application windows FA1 and FA2).

At least one probe for analyzing system activity of the electronic terminal may, for example, be able to provide information relating to some events related to multi-windowing, such as, for example, information representative of:
opening at least one new application window (including information on the position, size and display rank of the new application window);
closing at least one application window;
resizing and/or moving at least one application window (comprising information on the new position and/or size and/or display rank of the application window).

At least one probe for scanning the input devices associated with the electronic terminal may deliver data relating to the entry and/or pointing devices integrated or connected to the electronic terminal (e.g. physical keyboard, touch screen, mouse, touch pad, etc.) Thus, this probe can, for example, make it possible to know the characters entered by a user on a keyboard, the real-time position on the screen of a cursor associated with a pointing device (and therefore the display zone in which it is located), but also to detect events such as clicks or the use of vertical and/or horizontal scrolling functionality, etc. Such a scanning probe may, for example, take the form of an application programming interface (API) made available by the operating system of the electronic terminal.

According to some embodiments of the technique provided, the contextual characteristics obtained based on the usage data provided by these probes comprise, for example, for the zone considered among the plurality of display zones of the electronic terminal screen:

information CC1 relating to at least a duration for which the user's gaze has remained directed towards said at least one zone and/or to a number of times the user's gaze has been directed towards said at least one zone: for example, it may be possible, by means of the gaze detection probe, to detect that the user's gaze has returned to a zone more than 7 times (after having left it) for the last 5 minutes that have elapsed, and that the user has remained more than 3 minutes (as a cumulative time) on this zone during this period of time;

information CC2 relating to at least one type of application associated with at least one application window at least partially displayed in said at least one zone: for example, it may be possible, by means of the system activity probe, to detect that the zone considered is currently occupied mainly by text editing software;

information CC3 representative of at least one fixed or changing state of a content displayed in said at least one zone, independently of an action on a user interface of said terminal: for example, it is possible, by means of the system activity probe, to detect that the zone considered is currently displaying a video being played or an animated gif (changing state) or, on the contrary, an image or a text in PDF format (fixed state);

information CC4 representative of at least one interaction or absence of interaction with at least one content displayed in said at least one zone: for example, it may be possible, by means of the scanning probe of the input devices, to detect that the user is passive with respect to the zone considered or, on the contrary, that he/she performs numerous actions in this zone;

information CC5 representative of at least one type of interaction performed on the at least one zone: for example, it may be possible, by means of the input device scanning probe, to detect that the user has clicked via a pointing device in the zone considered, to determine the nature of at least one movement—for example continuous versus jerky—of a pointer associated with the pointing device within the zone, or even to identify that text is being entered into the zone by means of a keyboard.

The preceding list of contextual characteristics CC1 to CC5 is not exhaustive, and other contextual characteristics are likely to be obtained in step 11, including by means other than the probes previously described (e.g. from third party systems, or obtained within various data structures). Different levels of granularity can also be contemplated for contextual characteristics, with especially a finer cutting than that previously set out in connection with the contextual characteristics CC1 to CC5: for example, the contextual characteristic CC5 given by way of illustration above can be replaced with a plurality of more targeted contextual characteristics, e.g. a first contextual characteristic associated with a detection of clicks via a pointing device in the zone, a second contextual characteristic associated with the nature of movement of a pointer associated with the pointing device in the zone, a third contextual characteristic associated with keyboard entries in the zone, etc.

In a step 12, the electronic device determines the value of at least one activity indicator for the zone considered, depending on the contextual characteristics associated with the zone, previously obtained in step 11.

According to the technique provided, an activity indicator is an indicator for characterising an activity of at least one user with respect to a considered zone of the screen of the electronic terminal, at a given moment or for a given time interval.

Such activity indicators may include, in particular, in some embodiments:

a productivity indicator IA1 within the zone considered, representative of a content production level within this zone;

an attention indicator IA2 for the zone considered, representative of a level of interest (or attention) in a content displayed in this zone;

a complexity indicator IA3 for the zone considered, representative of a level of misunderstanding, difficulty encountered, and/or confusion with regard to a content displayed in this zone;

an introspection indicator IA4 associated with the zone considered, representative of a level of tiredness and/or reflection with regard to content displayed in this zone.

Of course, the preceding list of activity indicators IA1 to IA4 is not limitative, and other types of activity indicators are likely to be determined in step 12.

One example of calculating the value of an activity indicator, in some embodiments of the technique provided, taking account of at least some of the contextual characteristics obtained in step 11 is now set forth.

Firstly, a score (for example from 0 to 5) is assigned to the contextual characteristics obtained in step 11, according to a set of rules. For example:

the score S_CC1 assigned to the contextual characteristic CC1 is all the greater (i.e. close to 5 for example) as the time or the number of times the gaze is focused on the zone considered is important, and conversely;

the score S_CC2 assigned to the contextual characteristic CC2 takes account of the user's interaction possibilities depending on the type of application which is currently rendered in the zone considered: for example, a text editing application has a score of 5, a photo or video viewing application a score of 1, if no application is rendered in the zone, the score is 0 (case of a zone occupied solely by a screen background for example), etc.;

the score S_CC3 assigned to the contextual characteristic CC3 is for example 1 if the content is fixed and 4 if the content is changing (independently of any user action);

the score S_CC4 assigned to the contextual characteristic CC4 is for example rated between 1 and 5 depending on the degree of user's activity in the zone, and 0 if the user is completely passive and does not interact with the zone at all;

the score S_CC5 assigned to the contextual characteristic CC5 takes account of the nature of the user's interactions with the zone considered: for example, a keyboard entry is associated with a score of 5, while a simple scroll action is associated with a score of 1.

In some embodiments, secondly, scores associated with the contextual characteristics may be weighted, for example by weighting coefficients (e.g. real numbers or relative or natural integers, such as natural integers with values between 0 and 5) specific to the type of activity indicator considered. In other words, a set of weighting coefficients may be associated with a type of activity indicator, the purpose of these weighting coefficients being to give more or less importance to the various contextual characteristics, in accordance with the type of activity indicator considered. For example, the set of weights associated with the productivity indicator IA1 can be defined as follows:

coefficient 3 for the contextual characteristic CC1 (the time spent on a zone can be associated with a level of concentration and attention in connection with content creation and therefore with productivity);

coefficient 5 for the contextual characteristic CC2 (the type of application associated with the zone can be considered of great importance when estimating the user's productivity on the zone);

coefficient 1 for the contextual characteristic CC3 (the fixed or changing state of the content displayed in the zone—when the user is not interacting with the zone—can be considered of little importance when estimating the user's productivity on the zone);

coefficient 2 for the contextual characteristic CC4 (the degree of user interaction with the zone may reflect a level of productivity);

coefficient 5 for contextual characteristic CC5 (the detection of change in the zone, which directly results from the user's interactions with the zone, can be considered to have a strong impact on productivity).

Of course, the sets of weights can vary depending on the activity indicators. For example, different sets of weights will be associated with the previously introduced activity indicators IA2, IA3 and IA4. For example, a contextual characteristic associated with the type of movement of a pointer (continuous vs. jerky) in the zone considered may be assigned a high weighting coefficient for calculating the attention indicator IA2. Indeed, a continuous movement can often be associated with an activity of reading information on the screen by the user, while a jerky movement can be indicative of a search for the pointer on the screen and therefore of a transient activity sometimes associated with a drop in the user's attention. A lower weighting coefficient could be assigned to the contextual characteristic associated with the type of movement of a pointer (continuous vs. jerky) in the zone considered for calculating the productivity indicator IA1.

In some embodiments, thirdly, the value of the activity indicator for the zone considered may be obtained by summing the weighted scores associated with the contextual characteristics on which the activity indicator depends.

For example, reconsidering the previous example, the value associated with the productivity indicator can be given by the following formula:

$$IA1 = (3 \times SC\_CC1) + (5 \times SC\_CC2) + (1 \times SC\_CC3) + (2 \times SC\_CC4) + (5 \times SC\_CC1)$$

In some embodiments, the value of an activity indicator may be normalised, for example by dividing it by the sum of the weighting coefficients associated with the activity indicator so as to obtain a weighted average (between 0 and 5 in the case of the previous example), or by dividing it by the maximum achievable value of an activity indicator (so as to obtain a normalised value between 0 and 1).

In at least some embodiments, the values of the different activity indicators associated with a zone are potentially updated several times during a user session of the electronic terminal. For example, these values may be recalculated repeatedly, at regular or irregular time intervals. Alternatively or complementarily, the values of the activity indicators associated with a zone are updated upon detecting some events by at least one of the previously described probes, including especially:

opening, closing, resizing and/or moving at least one application window impacting the zone considered;

a duration for which the gaze is directed towards the zone considered for a first time interval of non-zero duration;

a number of times the gaze is returned to the zone considered for a second time interval of non-zero duration.

For example, the activity indicators associated with a zone may be updated if at least one gaze direction detection probe detects that the user has gazed at that zone for more than 3 minutes and has returned to it more than 4 times for the last 5 minutes.

In at least some embodiments of the technique provided, the update of a zone following detection of an event related to this zone may trigger a recalculation (that is, an update) of at least some (for example, all) of the activity indicators associated with at least some other (for example, all) of the zones of the screen of the electronic terminal (including those a priori not concerned by the event detected).

In some embodiments, a calculated activity indicator value may be stored within a data structure, thereby enabling, for example, a history of activity indicators associated with each zone, to be constituted. According to some embodiments, the activity indicators may be grouped by application type and/or by file in this or another data structure, depending on the content of an application window at least partially displayed in the zone at the time the activity indicators are calculated (by application type, it is meant the nature or name of the application, for example "spreadsheet" or "Microsoft Excel"; by file, it is meant the name of the particular document that the user is viewing or creating in that application, e.g. "my_file.xls"). If several application windows are at least partially displayed in the zone considered, the application window occupying the largest area of the zone considered is for example retained for grouping. An activity indicator is thus associated with an application or a file in a data structure, which makes it possible to constitute a history of activity indicator values for an application or a file. It is thus possible to retrieve history of all the activity indicators associated with a file when it is reopened, or, for example, to search for all the files associated or having been associated with a high-value attention indicator (i.e. which have been the subject of particular interest on the part of the user at least at one time).

Figure 2B:
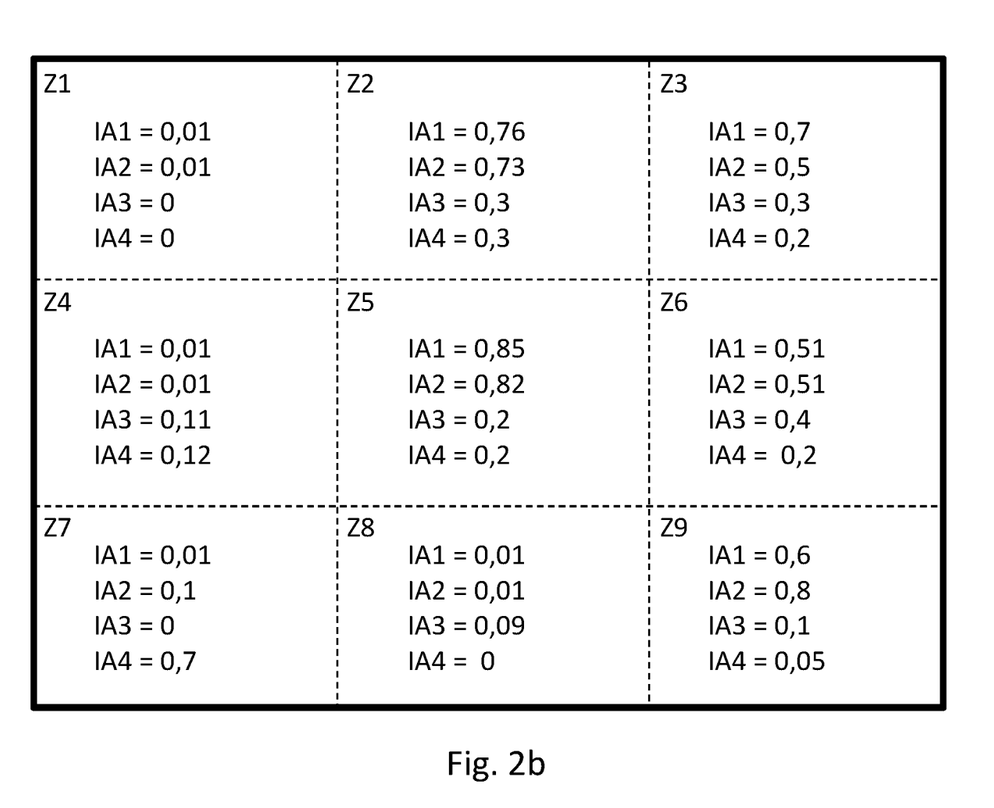
FIG. 2b shows an example of a matrix of activity indicators obtained after an example of application of the method of FIG. 1.

This mechanism achieves a multi-level mapping (by display zone, by type of application, by file) of activity indicators and their change over time (i.e. a history), thus forming a base utilisable by third-party or internal services as an overlay, for example for statistical purposes or to offer innovative services such as smart assistants. FIG. 2b illustrates in this respect (with arbitrary values chosen only for illustration purposes) a first mapping level which shows, at a given moment, values of different activity indicators for the 9 display zones as defined in the example of FIG. 2a, in a representation which can be referred to as a matrix representation.

Possible applications of such a mapping are multiple. For example:

if the productivity indicators associated with one or several adjacent zones are high, and the opening of a window related to a messaging-type application is detected in at least one other zone of the screen (different from this zone or these adjacent zones), an overlay service can suggest to the user to hide this new window (or automatically hide or fade it, for example by adapting the colours and/or the contrast). This action can be taken when the history of the user's productivity indicator shows that messaging activities have a strong impact on his/her productivity;

if the attention and complexity indicators associated with one or several adjacent zones are high, an overlay service can offer the user assistance in performing a task, for example by giving him/her access to appropriate tutorials (depending on the type of application detected in the zones considered, problems that may have been automatically identified by OCR character recognition techniques in the zones considered, etc.);

if the user's attention is diverted from an application where he/she is consuming content (video, podcast, animation, etc.) which had previously been the focus of his/her attention (sudden drop in the attention indicator in one zone, to the benefit of another zone), an overlay service can propose to automatically pause this content, or to record this content so that it can be replayed later if the user wants to resume where his/her attention was diverted.

These examples are, of course, given by way of purely illustrative and not limiting purposes.

According to another aspect, the technique provided is also concerned with an electronic device able to implement the above described method in any of its embodiments. More particularly, the electronic device according to the present technique comprises:

means for obtaining a set of contextual characteristics associated with at least one zone among a plurality of display zones of at least one screen of an electronic terminal, depending on data on the use of said terminal comprising data relating to a direction of gaze, data relating to a system activity of said terminal and/or data input to said terminal;

means for determining at least one activity indicator on said zone, depending on said contextual characteristics associated with said zone.

Figure 3:
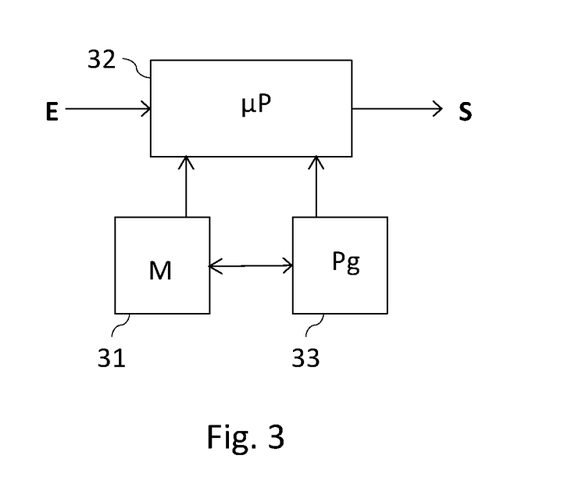
FIG. 3 describes a simplified architecture of an electronic device for implementing the technique provided, in one particular embodiment.

FIG. 3 represents, in a schematic and simplified manner, the structure of such an electronic device, in one particular embodiment. According to a first implementation, this electronic device can be integrated into, or the same as, the electronic terminal (e.g. computer, tablet, smartphone, etc.) of the user whose activity is desired to be analysed. According to a second implementation, this electronic device is integrated into, or the same as, another device that cooperates with the user's electronic terminal (this other device is for example a home gateway, also called an "set top box"). The electronic terminal further comprises at least one display (possibly several, for example in the case of an extended display configuration), which may be directly integrated into the terminal, or wired or wirelessly connected to the terminal.

The electronic device according to the technique provided comprises, for example, a memory 31 consisting of a buffer memory M, a processing unit 32, equipped for example with a microprocessor P, and driven by the computer program Pg 33, implementing the analysis method according to the development.

Upon initialisation, the code instructions of the computer program 33 are loaded into the buffer memory before being executed by the processor of the processing unit 32. The processing unit 32 receives as an input E, for example, usage data from, for example, various software and/or hardware probes which may be integrated into the electronic device itself and/or in the user's electronic terminal (e.g. probe for detecting a direction of gaze, probe for analyzing system activity of the terminal, probe for scanning at least one input device associated with the terminal, etc.). These data change over time, depending on the user's activity on his/her electronic terminal.

The microprocessor of the processing unit 32 then performs the steps of the automatic configuration method, according to the instructions of the computer program 33, to output O a set of activity indicators associated with different display zones of the screen of the electronic device. More particularly, the microprocessor 32 obtains a set of contextual characteristics associated with at least one zone among a plurality of display zones of at least one screen of the electronic terminal, from the usage data received as an input I, and then it determines at least one activity indicator associated with the zone considered based on these characteristics. The electronic device also comprises various communication interfaces (not represented), enabling it, for example, to communicate with various sensors and/or peripherals (e.g. camera, input device such as keyboard or mouse, etc.) for the implementation of the aforementioned software and/or hardware probes, or even to make the activity indicators determined available to one or several services internal or external to the user's electronic terminal, so that they can be utilised for the implementation of cross-cutting solutions of the smart assistant type, for example.

The invention claimed is:

1. A method for analyzing activity of an electronic terminal, the method comprising:

obtaining contextual characteristics associated with at least one application window among a plurality of application windows of a plurality of applications displayed on at least one screen of the electronic terminal, the contextual characteristics depending upon usage data of the electronic terminal comprising data relating to a direction of gaze, data relating to a system activity of the electronic terminal and/or data input to the electronic terminal via at least one user interface associated with the electronic terminal; and in response to detecting at least one event belonging to a group comprising opening, closing, resizing and/or moving the application window, associating, in a data structure, for each activity indicator of a plurality of activity indicators depending on the contextual characteristics associated with the application window, the activity indicator with:

an activity indicator value, depending on the usage data and on a set of weighting coefficients associated with the activity indicator;

an application name of the application associated with the application window and/or with a file corresponding to the content of the application window.

2. The method according to claim 1, wherein the electronic terminal usage data are delivered by software and/or hardware probes comprising at least a probe for detecting a direction of gaze, a probe for analyzing system activity of the electronic terminal, and/or a probe for scanning at least one input device associated with the electronic terminal.

3. The method according to claim 1, wherein the contextual characteristics associated with the application window belong to a group comprising:
- information relating to a duration for which a gaze is directed towards the application window;
- information relating to a number of times the gaze is directed towards the application window;
- information relating to a type of application associated with an application window at least partially displayed in the application window;
- information representative of a fixed or changing state of a content displayed in the application window, independently of an action on a user interface of the electronic terminal;
- information representative of an interaction or absence of interaction with a content displayed in the application window; and
- information representative of a type of interaction performed on the application window.

4. The method according to claim 1, wherein the plurality of activity indicators comprises at least:
- a productivity indicator within the application window, representative of a content production level within the application window, calculated depending on the contextual characteristics associated with the application window;
- an attention indicator for the application window, representative of a level of interest in a content displayed in the application window, calculated depending on the contextual characteristics associated with the application window;
- a complexity indicator of the application window, representative of a level of misunderstanding, difficulty encountered, and/or confusion with respect to a content displayed in the application window, calculated depending on the contextual characteristics associated with the application window; and
- an introspection indicator associated with the application window, representative of a level of tiredness and/or reflection with respect to a content displayed in the application window, calculated depending on the contextual characteristics associated with the application window.

5. The method according to claim 1, wherein the method comprises:
- assigning scores to the contextual characteristics, depending on the usage data;
- obtaining a set of weighting coefficients associated with the scores, depending on the activity indicator; and
- calculating the activity indicator value, depending on the scores and the set of weighting coefficients.

6. The method according to claim 1, wherein the method is implemented for a plurality of application windows among the application windows displayed on the at least one screen.

7. A processing circuit comprising a processor and a memory, the memory storing program code instructions of a computer program for implementing the method of analyzing activity of an electronic terminal according to claim 1, when the computer program is executed by the processor.

8. The processing circuit according to claim 7, wherein the electronic terminal usage data are delivered by software and/or hardware probes comprising at least a probe for detecting a direction of gaze, a probe for analyzing system activity of the electronic terminal, and/or a probe for scanning at least one input device associated with the electronic terminal.

9. The processing circuit according to claim 7, wherein the contextual characteristics associated with the application window belong to a group comprising:
- information relating to a duration for which a gaze is directed towards the application window;
- information relating to a number of times the gaze is directed towards the application window;
- information relating to a type of application associated with an application window at least partially displayed in the application window;
- information representative of a fixed or changing state of a content displayed in the application window, independently of an action on a user interface of the electronic terminal;
- information representative of an interaction or absence of interaction with a content displayed in the application window; and
- information representative of a type of interaction performed on the application window.

10. The processing circuit according to claim 7, wherein the plurality of activity indicators comprises at least:
- a productivity indicator within the application window, representative of a content production level within the application window, calculated depending on the contextual characteristics associated with the application window;
- an attention indicator for the application window, representative of a level of interest in a content displayed in the application window, calculated depending on the contextual characteristics associated with the application window;
- a complexity indicator of the application window, representative of a level of misunderstanding, difficulty encountered, and/or confusion with respect to a content displayed in the application window, calculated depending on the contextual characteristics associated with the application window; and
- an introspection indicator associated with the application window, representative of a level of tiredness and/or reflection with respect to a content displayed in the application window, calculated depending on the contextual characteristics associated with the application window.

11. The processing circuit according to claim 7, wherein the program code instructions further comprise instructions which, when executed by the computer program, perform acts comprising:
- assigning scores to the contextual characteristics, depending on the usage data;
- obtaining a set of weighting coefficients associated with the scores, depending on the activity indicator; and
- calculating the activity indicator value, depending on the scores and the set of weighting coefficients.

12. The processing circuit according to claim 7, wherein the method is implemented for a plurality of application windows among the application windows displayed on the at least one screen.

13. An electronic device for analyzing activity of an electronic terminal, the electronic device comprising:
- a processor; and
- a non-transitory computer-readable medium comprising instructions stored thereon, which when executed by the processor configure the electronic device to perform acts comprising:
  - obtaining contextual characteristics associated with at least one application window among a plurality of application windows of a plurality of applications displayed on at least one screen of the electronic terminal, the contextual characteristics depending upon usage data of the electronic terminal comprising data relating to a direction of gaze, data relating to a system activity of the electronic terminal and/or data input to the electronic terminal via at least one user interface associated with the electronic terminal; and in response to detecting at least one event belonging to a group comprising opening, closing, resizing and/or moving the application window, associating, in a data structure, for each activity indicator of a plurality of activity indicators depending on the contextual characteristics associated with the application window, the activity indicator with:

an activity indicator value, depending on the usage data and on a set of weighting coefficients associated with the activity indicator;

an application name of the application associated with the application window and/or with a file corresponding to the content of the application window.

14. The electronic device according to claim 13, wherein the electronic terminal usage data are delivered by software and/or hardware probes comprising at least a probe for detecting a direction of gaze, a probe for analyzing system activity of the electronic terminal, and/or a probe for scanning at least one input device associated with the electronic terminal.

15. The electronic device according to claim 13, wherein the contextual characteristics associated with the application window belong to a group comprising:

information relating to a duration for which a gaze is directed towards the application window;

information relating to a number of times the gaze is directed towards the application window;

information relating to a type of application associated with an application window at least partially displayed in the application window;

information representative of a fixed or changing state of a content displayed in the application window, independently of an action on a user interface of the electronic terminal;

information representative of an interaction or absence of interaction with a content displayed in the application window; and information representative of a type of interaction performed on the application window.

16. The electronic device according to claim 13, wherein the plurality of activity indicators comprises at least:

a productivity indicator within the application window, representative of a content production level within the application window, calculated depending on the contextual characteristics associated with the application window;

an attention indicator for the application window, representative of a level of interest in a content displayed in the application window, calculated depending on the contextual characteristics associated with the application window;

a complexity indicator of the application window, representative of a level of misunderstanding, difficulty encountered, and/or confusion with respect to a content displayed in the application window, calculated depending on the contextual characteristics associated with the application window; and an introspection indicator associated with the application window, representative of a level of tiredness and/or reflection with respect to a content displayed in the application window, calculated depending on the contextual characteristics associated with the application window.

17. The electronic device according to claim 13, wherein the non-transitory computer-readable medium further comprises instructions stored thereon, which when executed by the processor configure the electronic device to perform acts comprising:

assigning scores to the contextual characteristics, depending on the usage data;

obtaining a set of weighting coefficients associated with the scores, depending on the activity indicator; and calculating the activity indicator value, depending on the scores and the set of weighting coefficients.

18. The electronic device according to claim 13, wherein the acts are implemented for a plurality of application windows among the application windows displayed on the at least one screen.

19. A non-transitory computer-readable medium comprising a computer program stored thereon, which comprises program code instructions for executing a method for analyzing activity of an electronic terminal, when the instructions are executed by a processor of an electronic device, wherein the instructions configure the electronic device to perform acts comprising:

obtaining contextual characteristics associated with at least one application window among a plurality of application windows of a plurality of applications displayed on at least one screen of the electronic terminal, the contextual characteristics depending upon usage data of the electronic terminal comprising data relating to a direction of gaze, data relating to a system activity of the electronic terminal and/or data input to the electronic terminal via at least one user interface associated with the electronic terminal; and in response to detecting at least one event belonging to a group comprising opening, closing, resizing and/or moving the application window, associating, in a data structure, for each activity indicator of a plurality of activity indicators depending on the contextual characteristics associated with the application window, the activity indicator with:

an activity indicator value, depending on the usage data and on a set of weighting coefficients associated with the activity indicator;

an application name of the application associated with the application window and/or with a file corresponding to the content of the application window.

* * * * *